April 9, 1935.  G. MORE  1,997,068
GEAR CASING
Original Filed Feb. 2, 1931

Witness:
Chas. R. Koursh.

Inventor,
Glenn More,
Clarence E. Mehlhope
Atty

Patented Apr. 9, 1935

1,997,068

UNITED STATES PATENT OFFICE 1,997,068

GEAR CASING

Glenn More, Jamestown, N. Y., assignor to Blackstone Manufacturing Company, Jamestown, N. Y., a corporation of New York Original application February 2, 1931, Serial No. 512,781. Divided and this application April 25, 1932, Serial No. 607,263

1 Claim. (Cl. 74—606)

This invention relates to improvements in gear casings for washing machines and the like, and consists of the matters hereinafter described and more particularly pointed out in the appended claim.

The improved gear casing is designed specifically for washing machines of the inverted agitator or dolly type, in which the agitator operates in close relation to the bottom of the tub and is driven by a shaft extending vertically above the normal water line in the tub, where it is connected to said shaft.

The gear casing to which the improvement is applied is mounted below the bottom of the tub and closely adjacent thereto and provides a bearing for the aforesaid operating shaft, which depends through the bottom of the tub and into said casing, which contains the actuating gearing for said shaft and is oil-tight so that the gearing therein always operates in a bath of oil.

The object of the particular invention herein is to provide for by-passing water which might otherwise flow from the tub and seep into the gear casing by way of the packing through which the operating shaft enters the gear casing.

The present application is a division of application bearing Serial Number 512,781, heretofore filed by me on February 2nd, 1931.

The advantages of the invention will appear as I proceed with my specification.

In the drawing:—

Figure 1:
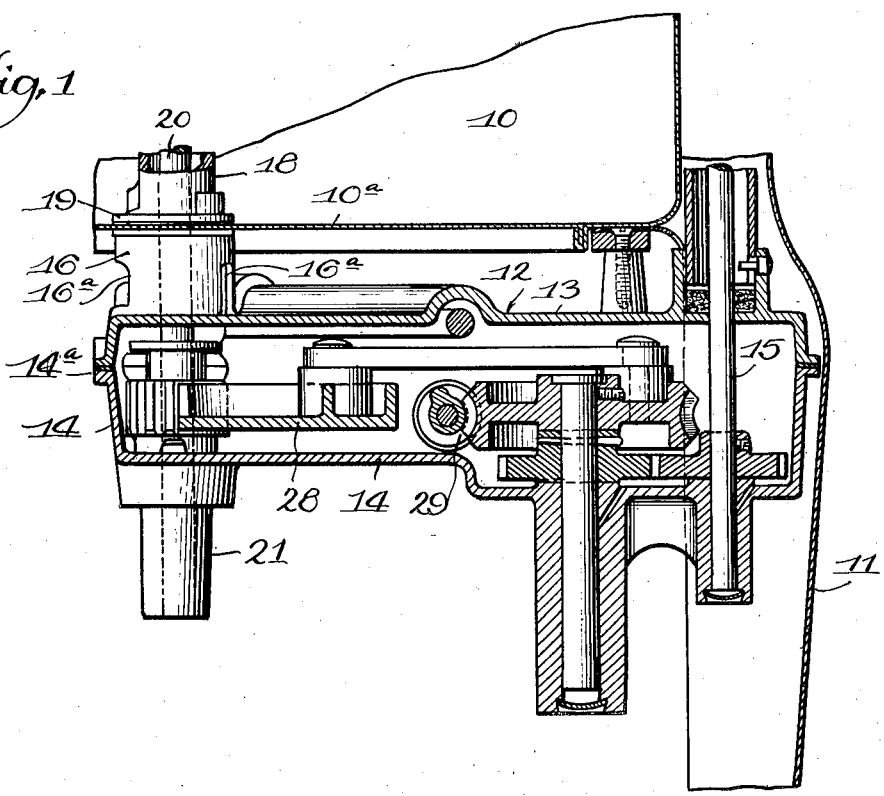
Figure 1 is a view representing a vertical central section through the gear casing in the plane of the vertical operating shaft.

Referring now to that embodiment of my invention illustrated in the drawing:—10 indicates a part of the tub of a washing machine to which the gear casing is applied. It is preferably made of sheet metal and is mounted on a base having legs, one of which is indicated at 11. 12 indicates the gear casing located below the tub and containing the operating gearing.

The gear casing 12 consists of top and bottom shells 13 and 14 having horizontal flanges 13a, 14a, respectively, by means of which they are attached together by suitable bolts with an interposed gasket to make the casing oil-tight. Said shells divide the casing as a whole along a horizontal plane. The casing extends from the neighborhood of the center of the tub 10 to a position somewhat beyond the side thereof, that is to say, from a position below the operating shaft for the washing machine to a position below the operating shaft for the wringer, indicated at 15.

Figure 2:
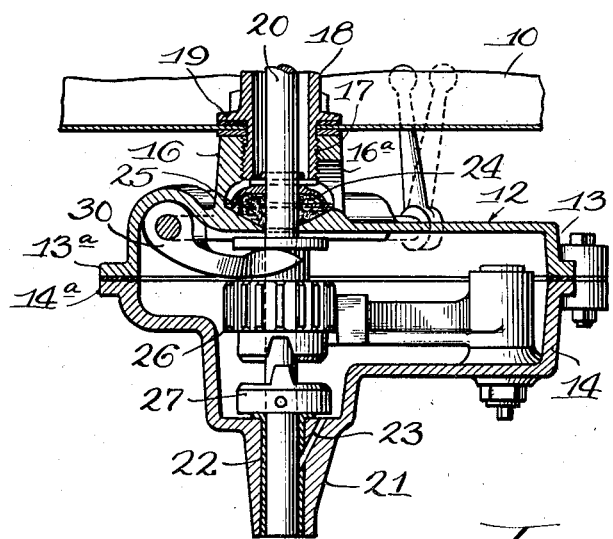
Figure 2 is a vertical section through the gear casing in a plane substantially at right angles to the section shown in Figure 1.

The top casing shell 13 has formed integrally with it an upstanding tubular boss 16, threaded internally to receive the threaded bottom, depending end 17 of the usual upright tubular post 18. This extends vertically in the tub and encloses and provides a bearing for the agitator operating shaft at its top in a familiar manner but not shown in the drawing. Said post has a horizontal radial flange 19 spaced above its bottom end (which depends through an aperture in the bottom wall of the tub) which flange and the top of the boss 16 of the casing shell engages between them the bottom wall 10a of the tub. Suitable gaskets, as clearly appear in Figure 2, are interposed on either side of the said bottom wall to make a water-tight joint. By this means leakage through the bottom of the tub to the operating shaft and its connection to the gearing below the tub is prevented.

20 indicates the operating shaft. Said shaft depends through an aperture formed in the top shell of the gear casing concentric with the boss 16 therein and then down through the casing and into a bearing recess in a boss 21 depending below the bottom of the shell 14. The shaft 20 has direct bearing in a bushing 22 fixed in said boss. An upwardly and outwardly inclined oilway 23 extending from the bottom of the casing down through the boss and through the bushing 22 provides for lubrication of the bottom end of the shaft 20.

A suitable gland 24 and packing 25 are provided in the neighborhood of the aperture, through which the shaft 20 enters the top shell 13 of the casing to provide a stuffing box at this point. While the arrangement described of connecting the post 18 and the boss 16 of the top shell 13 of the gear casing prevents any water from leaking out of the tub where said post goes through the bottom wall thereof, it is possible that in some manner water may enter the space between the operating shaft 20 and the interior of said post. To prevent such water from seeping into the casing through the stuffing box, the boss 16 is provided with one or more openings 16a. In the drawing two of such openings are shown. These provide an outlet for by-passing the water beyond the neighborhood of the gland 24 so that there is no danger of its standing on or about said gland and ultimately finding its way into the gear casing.

The gear casing contains the gearing for driving the operating shaft, including a pinion 26, vertically slidable on the operating shaft 20 to which it is adapted to be locked by means of a clutch 27 fixed to said shaft below the pinion; a segmental gear 28 engaged with said pinion; a worm gear and worm 29 connected to said segmental gear; an operating arm 30 for shifting said pinion; and other mechanisms connected thereto,—all of which are fully described in the application of which this it a division. As said gearing forms no part of the invention of the present application, a further description thereof is not required herein.

I claim as my invention:—

In combination with substantially horizontal, vertically spaced walls of separate containers, said walls having vertically aligned openings, a vertical shaft extending through said openings and being closely engaged by the opening in the lower wall but being spaced well within the opening in the upper wall, the lower wall being provided with an integral, upright sleeve, internally threaded at its upper end, concentric with the vertical axis of said shaft and having its upper end abutting said upper wall, an upright tubular bearing post for said shaft having an internal diameter greater than the diameter of said shaft, said tubular post having a flange engaged against the top side of said upper wall and having an end depending below said flange and threaded into said upright sleeve, means providing a stuffing box for said shaft at the opening in the lower wall, said upright sleeve being formed to provide an annular space above said stuffing box, communicating with the bottom end of said tubular post and having one or more laterally opening ports above said lower wall.

GLENN MORE.